(12) United States Patent
Kim et al.

(10) Patent No.: US 12,739,476 B2
(45) Date of Patent: Sep. 15, 2026

(54) ELECTRONIC APPARATUS PROVIDING RECOMMENDED CONTENT LIST AND CONTROLLING METHOD THEREOF

(71) Applicant: SAMSUNG ELECTRONICS CO., LTD., Suwon-si (KR)

(72) Inventors: Munseok Kim, Suwon-si (KR); Jongcheol Park, Suwon-si (KR); Jongil Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,062

(22) Filed: Sep. 14, 2023

(65) Prior Publication Data

US 2024/0064380 A1 Feb. 22, 2024

Related U.S. Application Data

(63) Continuation of application No. PCT/KR2023/012269, filed on Aug. 18, 2023.

(30) Foreign Application Priority Data

Aug. 18, 2022 (KR) ........................ 10-2022-0103601

(51) Int. Cl.

| | |
|---|---|
| ***H04N 21/482*** | (2011.01) |
| ***H04N 21/431*** | (2011.01) |
| ***H04N 21/458*** | (2011.01) |

(52) U.S. Cl.

CPC ....... *H04N 21/4826* (2013.01); *H04N 21/431* (2013.01); *H04N 21/458* (2013.01)

(58) Field of Classification Search

None

See application file for complete search history.

(56) References Cited

U.S. PATENT DOCUMENTS 7,853,972 B2 * 12/2010 Brodersen .............. H04N 7/163 725/39
9,767,102 B2 9/2017 Zhao (Continued)

FOREIGN PATENT DOCUMENTS

KR 10-1396383 5/2014
KR 10-2014-0098314 8/2014

(Continued)

OTHER PUBLICATIONS

International Search Report dated Dec. 5, 2023 in International Patent Application No. PCT/KR2023/012269.
PCT/ISA/237 dated Dec. 5, 2023 in International Patent Application No. PCT/KR2023/012269.

(Continued)

*Primary Examiner* — Alexander Q Huerta
(74) *Attorney, Agent, or Firm* — STAAS & HALSEY LLP

(57) ABSTRACT

An electronic apparatus including: a communication interface, a display, a memory to store at least one instruction and a processor to execute the at least one instruction to control the electronic apparatus. The processor may acquire information associated with a plurality of recommended contents based on a user viewing history by executing the at least one instruction, acquire information associated with a related content related to a target content, through the communication interface, the information associated with the related content being acquired based on the information associated with the plurality of recommended contents to allow the related content to be provided among the plurality of recommended contents, and control the display to output a user interface (UI) including a first UI element corresponding to the target content and a second UI element corresponding to the related content.

20 Claims, 15 Drawing Sheets

(56) References Cited

U.S. PATENT DOCUMENTS

| | | | | |
|---|---|---|---|---|
| 10,542,321 | B2 | 1/2020 | Eyer | |
| 11,928,167 | B2 | 3/2024 | Boyd et al. | |
| 2012/0210220 | A1* | 8/2012 | Pendergast | G06F 3/0482 715/716 |
| 2014/0195244 | A1 | 7/2014 | Cha et al. | |
| 2016/0050446 | A1* | 2/2016 | Fujioka | G06F 16/9535 725/93 |
| 2018/0011614 | A1* | 1/2018 | Wheeler | G06F 3/048 |
| 2020/0073540 | A1* | 3/2020 | Chai | G06F 3/0481 |
| 2020/0211061 | A1 | 7/2020 | Dasgupta et al. | |
| 2020/0301575 | A1* | 9/2020 | Lindholm | H04N 21/8549 |
| 2020/0304863 | A1* | 9/2020 | Domm | H04L 67/125 |
| 2022/0318325 | A1 | 10/2022 | Boyd et al. | |
| 2022/0394349 | A1* | 12/2022 | Sanders | G06F 21/604 |
| 2023/0118698 | A1 | 4/2023 | Choi et al. | |

FOREIGN PATENT DOCUMENTS

| | | |
|---|---|---|
| KR | 10-2016-0078111 | 7/2016 |
| KR | 10-2017-0114673 | 10/2017 |
| KR | 10-2128898 | 7/2020 |
| KR | 10-2164836 | 10/2020 |
| KR | 10-2206661 | 1/2021 |
| KR | 10-2304475 | 9/2021 |
| KR | 10-2021-0157142 | 12/2021 |
| KR | 10-2022-0078471 | 6/2022 |
| KR | 10-2022-0095445 | 7/2022 |
| KR | 10-2023-0059608 | 5/2023 |
| KR | 10-2023-0162696 | 11/2023 |

* cited by examiner

ELECTRONIC APPARATUS PROVIDING RECOMMENDED CONTENT LIST AND CONTROLLING METHOD THEREOF

CROSS-REFERENCE TO RELATED APPLICATION(S)

This application is a continuation application, under 35 U.S.C. § 111(a), of international application No. PCT/KR2023/012269, filed on Aug. 18, 2023, which claims priority under 35 U. S. C. § 119 to Korean Patent Application No. 10-2022-0103601, filed on Aug. 18, 2022, the disclosures of which are incorporated herein by reference in their entireties.

BACKGROUND

Field

Apparatuses and methods consistent with the disclosure relate to an electronic apparatus and a controlling method thereof, and more particularly, to an electronic apparatus providing a list of recommended contents and a controlling method thereof.

Description of the Related Art

A conventional apparatus that provides a list of recommended contents may acquire the list of the recommended contents suitable for a user based on a user viewing history, and provide the user with the acquired list of recommended contents.

SUMMARY

According to one or more embodiments of the disclosure, an electronic apparatus includes: a communication interface; a display; a memory to store at least one instruction; and a processor execute the at least one instruction to control the electronic apparatus. The processor may acquire information associated with a plurality of recommended contents based on a user viewing history by executing the at least one instruction. The processor may acquire information associated with a related content related to a target content, through the communication interface, the information associated with the related content being acquired based on the information associated with the plurality of recommended contents to allow the related content to be provided among the plurality of recommended contents. The processor may acquire control the display to output a user interface (UI) including a first UI element corresponding to the target content and a second UI element corresponding to the related content.

According to other embodiments of the disclosure, a method of controlling an electronic apparatus includes: acquiring information associated with a plurality of recommended contents based on a user viewing history. The method may include acquiring information associated with a related content related to a target content f, the information associated with the related content being acquired based on the information associated with the plurality of recommended contents to allow the related content to be provided among the plurality of recommended contents through the communication interface. The method may include displaying a user interface (UI) including a first UI element corresponding to the target content and a second UI element corresponding to the related content.

According to other embodiments of the disclosure, provided is a non-transitory computer-readable recording medium which includes a program to execute a method of an electronic apparatus, wherein the method includes acquiring information associated with a plurality of recommended contents based on a user viewing history. The method includes acquiring information associated with a related content related to a target content, the information associated with the related content being acquired based on the information associated with the plurality of recommended contents to allow the related content to be provided among the plurality of recommended contents through the communication interface. The method includes displaying a user interface (UI) including a first UI element corresponding to the target content and a second UI element corresponding to the related content.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
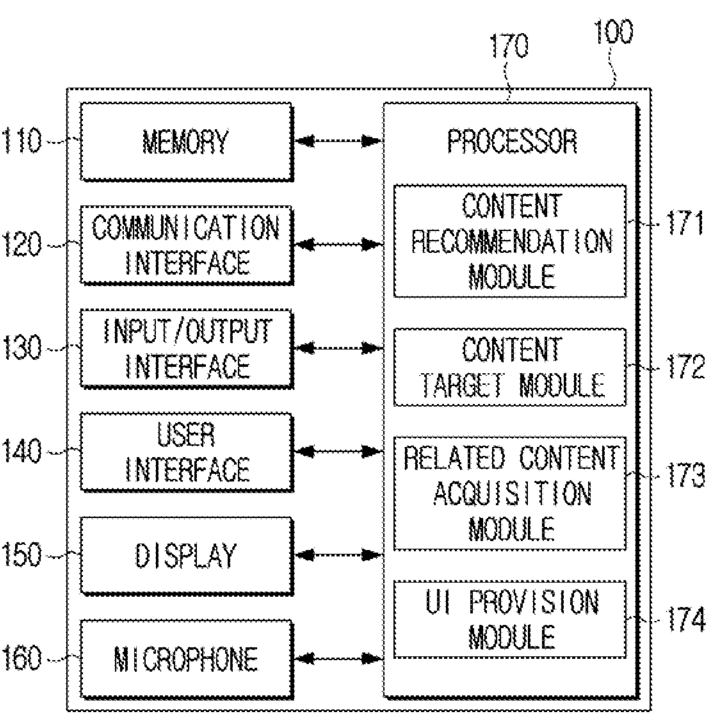
FIG. 1 is a block diagram for explaining a configuration of an electronic apparatus according to one or more embodiments of the disclosure.

The disclosure may be variously modified and have various embodiments. Therefore, specific embodiments are shown in the accompanying drawings and described in detail in the specification. However, it is to be understood that the scope of the disclosure is not limited to the specific embodiments, and includes various modifications, equivalents, or alternatives according to the embodiments of the disclosure. Throughout the accompanying drawings, similar components are denoted by similar reference numerals.

In describing the disclosure, the description omits a detailed description of a case where the detailed description for the known functions or configurations related to the disclosure is determined to unnecessarily obscure the gist of the disclosure.

In addition, the following embodiments may be modified in various different forms, and the scope and spirit of the disclosure are not limited to the following embodiments. Rather, these embodiments are provided to make the disclosure thorough and complete, and to completely transfer the spirit of the disclosure to those skilled in the art.

Terms used in the disclosure are used only to describe the specific embodiments rather than limiting the scope of the disclosure. A term of a singular number may include its plural number unless explicitly indicated otherwise in the context.

In the disclosure, an expression "have," "may have," "include," "may include" or the like, indicates existence of a corresponding feature (for example, a numerical value, a function, an operation or a component such as a part), and does not exclude existence of an additional feature.

In the disclosure, expressions "A or B," "least one of A and/or B," "one or more of A and/or B" and the like, may include all possible combinations of items enumerated together. For example, "A or B," "at least one of A and B" or "at least one of A or B" may indicate all of 1) a case where at least one A is included, 2) a case where at least one B is included, or 3) a case where both of at least one A and at least one B are included.

Expressions "first," "second" and the like, used in the disclosure may indicate various components regardless of a sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component is directly coupled to another component or may be coupled to another component through still another component (for example, a third component).

On the other hand, in case that any component (for example, a first component) is mentioned as being "directly coupled" or "directly connected" to another component (for example, a second component), it is to be understood that still another component (for example, a third component) does not exist between any component and another component.

An expression "configured (or set) to" used in the disclosure may be replaced by an expression "suitable for," "having the capacity to," "designed to," "adapted to," "made to" or "capable of" based on a situation. The expression "configured (or set) to" may not necessarily indicate "specifically designed to" in hardware.

Instead, an expression a "device configured to" in any situation may indicate that the device may "perform~" together with another device or component. For example, "a processor configured (or set) to perform A, B and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor except for a "module" or an "~er/or" that needs to be implemented by specific hardware. Meanwhile, various elements and regions in the drawings are schematically shown. Therefore, the spirit of the disclosure is not limited by relative sizes or intervals shown in the accompanying drawings.

The disclosure is devised to solve problem(s) in existing systems, and aims to provide an electronic apparatus that provides a differentiated scenario by providing information on the related content together with the list of the recommended contents, and a controlling method thereof.

An aspect of the disclosure is not limited to the above-mentioned aspect. That is, another aspect that is not mentioned may be obviously understood by those skilled in the art from the following description.

Hereinafter, the embodiments of the disclosure are described in detail with reference to the accompanying drawings for those skilled in the art to which the disclosure pertains to easily practice the disclosure.

FIG. 1 is a block diagram for explaining a configuration of an electronic apparatus according to one or more embodiments of the disclosure.

An electronic apparatus 100 may include a memory 110, a communication interface 120, an input/output interface 130, a user interface 140, a display 150, a microphone 160, and a processor 170. The electronic apparatus 100 may omit some of the above components, or further include another component.

In addition, the electronic apparatus 100 may be implemented as a server, which is only an example, and the electronic apparatus 100 may be implemented in various forms such as a set-top box, a television (TV), a smart TV, a smartphone, a mobile phone, a personal digital assistant (PDA), a laptop computer, a media player, an e-reader, a digital broadcasting terminal, a navigation device, a kiosk, a moving picture experts group (MPEG) audio layer-3 (MP3) player, a wearable device, a home appliance, and another mobile or non-mobile device. In addition, the electronic apparatus 100 may be connected to another external apparatus to perform one or more functions.

The memory 110 may store at least one instruction related to the electronic apparatus 100. The memory 110 may store an operating system (O/S) for driving the electronic apparatus 100 therein. In addition, the memory 110 may store various software programs or applications for operating the electronic apparatus 100 according to various embodiments of the disclosure. In addition, the memory 110 may include a semiconductor memory such as a flash memory, or a magnetic storing medium such as a hard disk, or the like.

In detail, the memory 110 may store various software modules for operating the electronic apparatus 100 according to the various embodiments of the disclosure, and the processor 170 may execute the various software modules stored in the memory 110 to control an operation of the electronic apparatus 100. That is, the memory 110 may be accessed by the processor 170, and readout, recording, correction, deletion, update and the like of data may be performed by the processor 170.

Meanwhile, in the disclosure, the term "memory 110" may include the memory 110, a read only memory (ROM, not shown) or a random access memory (RAM, not shown) in the processor 170, or a memory card (not shown, and for example, a micro secure digital (SD) card or a memory stick) mounted in the electronic apparatus 100.

In addition, the communication interface 120 may include circuitry and communicate with an external apparatus and a server. The communication interface 120 may perform the communication with the external apparatus or the server based on a wired or wireless communication method. The communication interface 120 may include a Bluetooth module (not shown), a wireless-fidelity (Wi-Fi) module (not shown), an infrared (IR) module, a local area network (LAN) module, an Ethernet module, or the like. Here, each communication module may be implemented in the form of at least one hardware chip. In addition to the above-described communication methods, a wireless communication module may include at least one communication chip performing the communication based on various wireless communication standards such as zigbee, universal serial bus (USB), mobile industry processor interface camera serial interface (MIPI CSI), third generation (3G), 3rd generation partnership project (3GPP), long term evolution (LTE), LTE advanced (LTE-A), 4th generation (4G), and 5th generation (5G). However, this configuration is only an example, and the communication interface 120 may use at least one communication module among various communication modules. In addition, the electronic apparatus 100 may control the external apparatus to display a user interface (UI) through the communication interface 120.

The input/output interface 130 may be any of a high definition multimedia interface (HDMI), a mobile high-definition link (MHL), a universal serial bus (USB), a display port (DP), a Thunderbolt, a video graphics array (VGA) port, a red-green-blue (RGB) port, a D-subminiature (D-SUB) or a digital visual interface (DVI).

The input/output interface 130 may input/output at least one of an audio or video signal. According to one or more embodiments, the input/output interface 130 may include a port for inputting and outputting only an audio signal and a port for inputting and outputting only a video signal as its separate ports, or may be implemented as a single port for inputting and outputting both the audio signal and the video signal. The electronic apparatus 100 may output a video signal for displaying the UI including a UI element corresponding to a content through the input/output interface 130.

The user interface 140 may receive a user command for controlling the electronic apparatus 100. The user interface may be implemented in a device such as a button, a touch pad, a mouse or a keyboard, or may be implemented in a touch screen capable of performing both a display function and a manipulation input function. Here, the button may be any of various types of buttons such as a mechanical button, a touch pad, or a wheel, which is positioned on any region of a body appearance of the electronic apparatus 100, such as its front surface portion, side surface portion, or rear surface portion. The electronic apparatus 100 may acquire various user inputs through the user interface 140. The electronic apparatus 100 may acquire a user input for selecting the UI element included in the UI displayed on the display 150 through the user interface 140.

The display 150 may be implemented as a display including a self-light emitting element or a display including a non-light emitting element and a backlight. For example, the display may be implemented in various types of displays such as a liquid crystal display (LCD), an organic light emitting diode (OLED), a light emitting diode (LED), a micro light emitting diode (micro LED), a mini LED, a plasma display panel (PDP), a quantum dot (QD) display, a quantum dot light-emitting diode (QLED). The display 150 may also include a driving circuit, a backlight unit, and the like, which may be implemented in a form such as an a-si thin film transistor (TFT), a low temperature poly silicon (LTPS) TFT, an organic TFT (OTFT), or the like.

According to one or more embodiments of the disclosure, the electronic apparatus 100 may provide various screens such as the UI including the UI element, and the electronic apparatus 100 may here control the display 150 to display the various screens. In addition, the electronic apparatus 100 may be connected to an external display device (e.g., television (TV), monitor, tablet PC, laptop computer, or desktop computer) in a wired/wireless manner through the communication interface 120 or the input/output interface 130. The electronic apparatus 100 may transmit a signal for controlling the external display device to the external display device for a screen to be displayed on the external display device and provided to a user.

In addition, the electronic apparatus 100 may transmit a signal to the external display device for audio to be output together with the screen. That is, the electronic apparatus 100 may transmit the video signal for displaying the screen and the audio signal for outputting the audio to the external display device. Here, the electronic apparatus 100 may transmit the video signal and the audio signal to the external display device through the same communication interface 120 or the same input/output interface 130, which is only an example, and may transmit the video signal and the audio signal to the external display device by using a different method.

For example, the electronic apparatus 100 may transmit the video signal and the audio signal together to the external display device through the HDMI, DP, or Thunderbolt interface, which is only an example, and may transmit the video signal and the audio signal to then external display device by using a different interface.

The microphone 160 may refer to a module that acquires the audio and converts the same into an electrical signal, and may be a condenser microphone, a ribbon microphone, a moving coil microphone, a piezoelectric element microphone, a carbon microphone, or a micro electro mechanical system (MEMS) microphone. In addition, the microphone may be implemented using an omni-directional method, a bi-directional method, a uni-directional method, a sub-cardioid method, a super-cardioid method, or a hyper-cardioid method.

In addition, the electronic apparatus 100 may acquire a user voice through the microphone 160 included in the electronic apparatus 100. Alternatively, the electronic apparatus 100 may acquire the user voice from the external apparatus equipped with the microphone. In detail, the microphone may be positioned in a separate external apparatus such as a remote control, a smartphone, or a speaker that transmits a signal to the electronic apparatus 100. Here, the microphone positioned in the external apparatus may digitize an analog voice signal, and the electronic apparatus 100 may receive a digitized voice signal by performing the communication connection with the external apparatus through the communication interface 120.

Here, a remote control application may be installed in the external apparatus. In addition, the external apparatus may control the electronic apparatus 100 through the remote control application, and perform a user voice recognition function. Here, the external apparatus may communicate with the electronic apparatus 100 and the server through the plurality of communication interfaces.

In addition, the external apparatus in which the remote control application is installed may be the smartphone, which is only an example, and the external apparatus may be implemented in various devices in which an application such as an artificial intelligence (AI) speaker may be installed.

In addition, the electronic apparatus 100 may be connected to the external apparatus in the wired/wireless manner through the communication interface 120 or the input/output interface 130, and the electronic apparatus 100 may receive an audio signal for the user voice from the external apparatus.

In addition, the electronic apparatus 100 may transmit the audio signal to the external server by performing the communication connection with the external server through the communication interface 120.

Here, the server may be a speech-to-text (STT) server that converts the audio signal into text. The electronic apparatus 100 may perform the communication connection with the STT server through the communication interface 120 to thus receive data processed by the STT server and transmit the received data to another server. However, the electronic apparatus 100 is not limited thereto, and may acquire the data processed through a STT module included in the electronic apparatus 100 without transmitting the audio signal to the external server.

The electronic apparatus 100 may control the components of the electronic apparatus 100 to perform various operations by using text data acquired from the STT server or the STT module. However, the electronic apparatus 100 is not limited thereto, may transmit, to the STT server or the external server, the text data acquired by performing the communication connection with the STT server or the external server through the communication interface 120, and control the components of the electronic apparatus 100 to perform various operations based on the data received from the STT server or the external server.

The processor 170 may control overall operations of the electronic apparatus 100. In detail, the processor 170 may be connected to the components of the electronic device 100 including the memory 110 as described above, and control the overall operations of the electronic apparatus 100 by executing at least one instruction stored in the memory 110 as described above.

The processor 170 may be implemented in various ways. For example, the processor 170 may be implemented as at least one of an application specific integrated circuit (ASIC), an embedded processor, a microprocessor, a hardware control logic, a hardware finite state machine (FSM) or a digital signal processor (DSP). Meanwhile, in the disclosure, the term "processor 170" may be used to include a central processing unit (CPU), a graphic processing unit (GPU), a main processing unit (MPU), or the like.

The processor 170 may perform an operation of implementing the various embodiments of the disclosure through a plurality of modules.

In detail, data on the plurality of modules according to the disclosure may be stored in the memory 110, and the processor 170 may access the memory 110 to load the data on the plurality of modules into the memory or a buffer inside the processor 170, and then implement the various embodiments according to the disclosure by using the plurality of modules. Here, the plurality of modules may include a content recommendation module 171, a content target module 172, a related content acquisition module 173, and a UI provision module 174.

However, at least one of the plurality of modules according to the disclosure may be implemented as hardware and included in the processor 170 in the form of a system on chip.

Alternatively, at least one of the plurality of modules according to the disclosure may be implemented as the separate external apparatus, and the electronic apparatus 100 and each module may perform the communication and an operation according to the disclosure.

Hereinafter, the description describes the operations of the plurality of modules according to the disclosure in detail.

Figure 2:
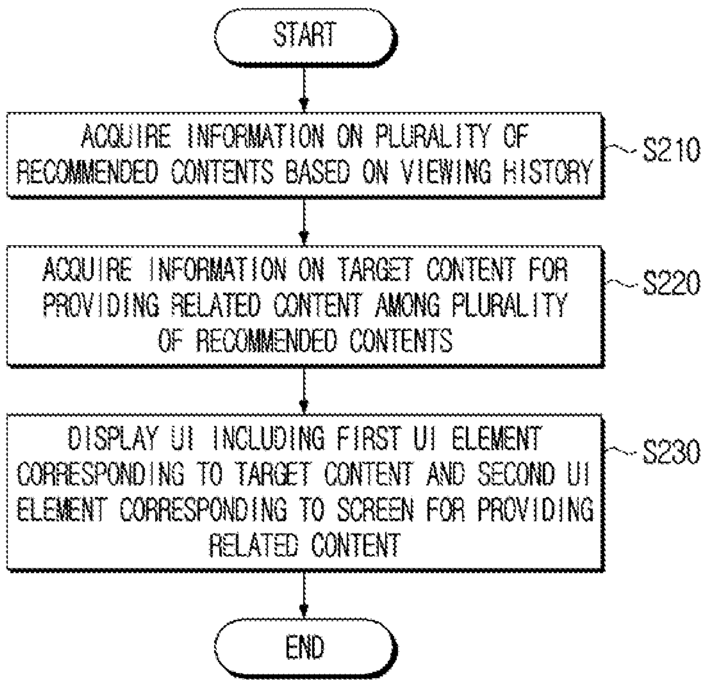
FIG. 2 is a flowchart for explaining a controlling method of an electronic apparatus according to other embodiments of the disclosure.

Referring to FIG. 2, the content recommendation module 171 may acquire information on a plurality of recommended contents based on a viewing history (S210). Here, the viewing history may be a user viewing history.

In detail, the content recommendation module 171 may acquire information on the user viewing history and information on metadata of the plurality of contents. In addition, the content recommendation module 171 may acquire a value representing a user preference for each of the plurality of contents based on the information on the user viewing history and the information on the metadata of the plurality of contents. In addition, the content recommendation module 171 may acquire information on a predetermined number of contents in an order of highest value representing the acquired user preference.

For example, in case that the user mainly views movies of an "action" genre, the information on the plurality of recommended contents may include information on an action movie content.

Here, the information on the plurality of recommended contents may include metadata of each of the plurality of recommended contents. Here, the metadata may include at least one of a content title, a content genre, an actor of the content, a director of the content, a position where the content is filmed, an object included in the content, information on the user preference for the content, a content viewing history, information on the content viewing history, or a popularity rank of the content.

In addition, the information on the plurality of recommended contents may include information on a list of recommended contents including the plurality of recommended contents. Here, the information on the list of the recommended contents may include information on a disposition pattern of the list of the recommended contents. That is, the plurality of recommended contents may be provided in a form of the list of the recommended contents including a plurality of rows and a plurality of columns. Here, the information on the disposition pattern of the list of the recommended contents may be information on the rows and the columns where each of the plurality of recommended contents is disposed in the list.

Here, the information on the disposition pattern of the list of the recommended contents may be information on positions where the list of the plurality of recommended contents is output on the display.

Figure 3:
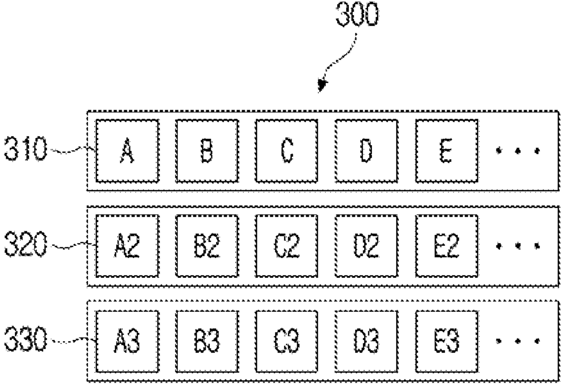
FIG. 3 is a view for explaining a list of recommended contents according to one or more embodiments of the disclosure.

For example, the list of the recommended contents may be as shown in FIG. 3. Here, in a list of recommended contents 300, a content 310 disposed on a row #1 may include A, B, C, D, and E; a content 320 disposed in a row #2 may include A2, B2, C2, D2, and E2; and a content 330 disposed in a row #3 may include A3, B3, C3, D3, and E3. Here, B2 may be a content disposed in the row #2 and a column #2.

Here, each row in the list of the recommended contents may be classified based on a criterion for classifying the plurality of recommended contents. In detail, the criterion for classifying the plurality of recommended contents may be a topic of the content. For example, in the list of the recommended contents, the topic of the content disposed on the row #1 may be a "content being viewed," the topic of the content disposed on the row #2 may be a "popular content," and the topic of the content disposed on the row #3 may be the "action movie."

In addition, the content recommendation module 171 may acquire the information on the plurality of recommended contents based on the user viewing history and content information stored in the memory 110, which is only an example, and the content recommendation module 171 may acquire the information on the plurality of recommended contents from the external server. In detail, in case of acquiring a user input for displaying information on the plurality of recommended contents, the content recommendation module 171 may request the external server for the information on the plurality of recommended contents. Accordingly, the external server may acquire the information on the plurality of recommended contents based on the user viewing history and content information stored in the memory of the external server, and transmit the acquired information to the electronic apparatus 100.

Meanwhile, as described above, the acquired list of recommended contents may be a list acquired based on the user viewing history. However, this list may be a list uniformly provided for similar user viewing histories.

Meanwhile, the content target module 172 may acquire information on a target content for providing the related content among the plurality of recommended contents based on the information on the plurality of recommended contents (S220). Here, the content target module 172 may identify the target content based on the acquired information on the plurality of recommended contents, which is only an example, and the content target module 172 may acquire the information on the target content from the external server or the external apparatus that identifies the target content through the communication interface 120. Meanwhile, according to one or more embodiments of the disclosure, the content target module 172 may acquire the information on the target content based on the metadata of each of the plurality of recommended contents.

Here, the content target module 172 may identify whether the metadata of each of the plurality of recommended contents satisfies a specific condition.

In detail, the content target module 172 may identify whether the metadata of each of the plurality of recommended contents includes a specific word. In addition, the content target module 172 may identify, as the target content, a content whose metadata includes the specific word. For example, the content target module 172 may identify, as the target content, a content whose title includes a word "love." Alternatively, the content target module 172 may identify, as the target content, a content where the actor of the content is "A." Alternatively, the content target module 172 may identify, as the target content, a content where a specific product "A" is the object included in the content.

Alternatively, the content target module 172 may compare a numerical value included in the metadata of each of the plurality of recommended contents with a predetermined value. In addition, the content target module 172 may acquire the information about the target content based on a comparison result. For example, the content target module 172 may identify whether the numerical value representing the user preference for each of the plurality of contents is the predetermined value or more. In addition, the content target module 172 may identify, as the target content, a content whose numerical value representing the user preference for the content is the predetermined value or more. Alternatively, the content target module 172 may identify, as the target content, a content having the highest value indicating the user preference for the content.

According to one or more embodiments of the disclosure, the content target module 172 may acquire the information on the target content based on the information on the disposition pattern of the list of the recommended contents.

In detail, the content target module 172 may identify, as the target content, at least one of a predetermined plurality of contents in case that the predetermined plurality of contents are consecutively arranged in the same row in the list of the recommended contents. For example, the predetermined plurality of contents may be a content A, a content B, or a content C. Here, the content target module 172 may identify, as the target content, at least one of the content A, the content B, or the content C in case that the content A, the content B, or the content C are respectively disposed in columns #1, #2, and #3 in the row #1 of the list of the recommended contents.

Alternatively, the content target module 172 may identify a predetermined content as the target content in case that the predetermined content is disposed in a row corresponding to a predetermined topic in the list of the recommended contents. For example, the predetermined topic may be the "popular content," and the predetermined content may be the content A. Here, the content target module 172 may identify the content A as the target content in case that the content A is disposed in a row corresponding to the "popular content."

Alternatively, the content target module 172 may identify, as the target content, a content disposed in a predetermined column of the row corresponding to the predetermined topic in the list of the recommended contents. For example, the predetermined topic may be the "popular content," and the predetermined column may be the column #3. Here, the content target module 172 may identify, as the target content, the content disposed in the column #3 of the row corresponding to the "popular content."

Alternatively, the content target module 172 may identify, as the target content, a content disposed at a predetermined position in the list of the recommended contents displayed on the screen. Here, the list of the recommended contents displayed on the screen may refer to a portion displayed on a display screen provided to the user among the list of the recommended contents. That is, a part of the list of the recommended contents may be provided on the display screen based on the size or resolution of the display screen. Here, the display may be a display of the external apparatus, which is only an example, and the display may be the display 150 of the electronic apparatus 100. For example, the predetermined position may be the column #1 of a top row in the content list displayed on the screen. Here, the content target module 172 may identify, as the target content, the content positioned in the column #1 of the top row in the list of the recommended contents displayed on the screen.

In addition, the related content acquisition module 173 may acquire the information on the related content related to the target content based on the information on the target content.

Here, the related content acquisition module 173 may acquire the information on the related content from the content information stored in the memory 110, which is only an example, and the related content acquisition module 173 may acquire the information on the related content from the external server that stores the information on the related content through the communication interface 120. Here, the related content may be a content related to metadata of the target content. In detail, the metadata of the related content may match the metadata of the target content. For example, an actor of the target content may be "A" based on the metadata of the target content. Here, the related content acquisition module 173 may acquire information on a content where the actor is "A."

Alternatively, the related content may be an advertisement content for the metadata of the target content. For example, on object included in the target content may be a smartphone "A" based on the metadata of the target content. Here, the related content may be an advertisement content of the smartphone "A."

Alternatively, the related content may be a content viewed by other users who viewed the target content. Alternatively, the related content may be a content having the highest viewing number of times among the content viewed by other users who viewed the target content.

In addition, the UI provision module 174 may provide a UI including a first UI element corresponding to each of the plurality of recommended contents and a second UI element corresponding to a screen for providing the related content. Here, in order to provide the UI, the UI provision module 174 may control the display 150 to display the UI including the first UI element and the second UI element, which is only an example, and the UI provision module 174 may transmit a control signal for displaying the UI including the first UI element and the second UI element to the external apparatus including the display.

In addition, the UI element corresponding to the content may be a UI element that provides the content or enters a screen for providing the content.

In addition, the UI element corresponding to each of the plurality of recommended contents may include a UI element corresponding to the target content. In addition, the UI element included in the UI may be provided in the form of a list including the plurality of rows and the plurality of columns, and the UI element may be disposed in each row and each column.

Here, a disposition pattern of the UI elements included in the UI may be based on the disposition pattern of the list of the recommended contents acquired by the content recommendation module 171. In detail, the UI provision module 174 may further dispose a UI element for providing the related content in the list in which the UI elements corresponding to each of the plurality of recommended contents are disposed in the same way as the disposition pattern of the list of the recommended contents. Here, the UI element for providing the related content may be disposed on one side of the UI element corresponding to the target content.

That is, the UI provision module 174 may provide the UI including the first UI element corresponding to the target content and the second UI element corresponding to the screen for providing the related content (S230). Here, the second UI element may be displayed in a region adjacent to that of the first UI element. That is, the UI provision module 174 may control the display 150 to display the second UI element in the region adjacent to that of the first UI element.

Figure 4:
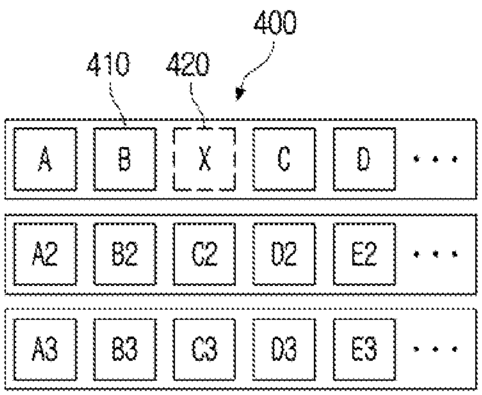
FIG. 4 is a view for explaining a user interface (UI) including a UI element corresponding to related content according to one or more embodiments of the disclosure.

In detail, the second UI element may be provided on one side of the first UI element. For example, the second UI element may be provided on the right, left, upper, or lower side of the first UI element. For example, the target content may be the content B, and a related content X, which is a content related to the content B, may be disposed on the right side of the content B. Here, as shown in FIG. 4, the UI provision module 174 may provide a UI 400 in which a UI element 420 corresponding to the related content X is disposed on the right side of a UI element 410 corresponding to the target content B.

That is, the UI provision module 174 may control the display 150 to display a plurality of UI elements including the first UI element. Here, the UI provision module 174 may control the display 150 to display the second UI element between one of the plurality of UI elements and the first UI element.

Meanwhile, a position where the second UI element is disposed on the UI may have the same row or the same column as those of a position where the first UI element is disposed.

Figure 5:
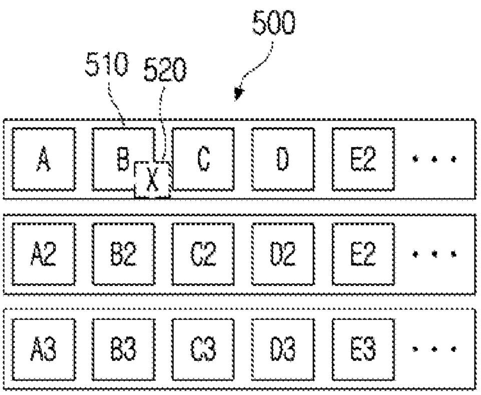
FIG. 5 is a view for explaining a UI including a UI element corresponding to related content according to one or more embodiments of the disclosure.

Alternatively, the position where the second UI element is disposed on the UI may overlap the position where the first UI element is disposed. Here, as shown in FIG. 5, the UI provision module 174 may provide a UI element 500 in which a UI element 520 corresponding to the related content X is disposed at a position overlapping that of a UI element 510 corresponding to the target content B.

Meanwhile, according to one or more embodiments of the disclosure, the electronic apparatus 100 may control the external apparatus including the display to display the UI on the display. In detail, the UI provision module 174 may transmit information necessary for the external apparatus to display the UI on the display to the external apparatus through the communication interface 120 or the user interface 130.

Figure 6:
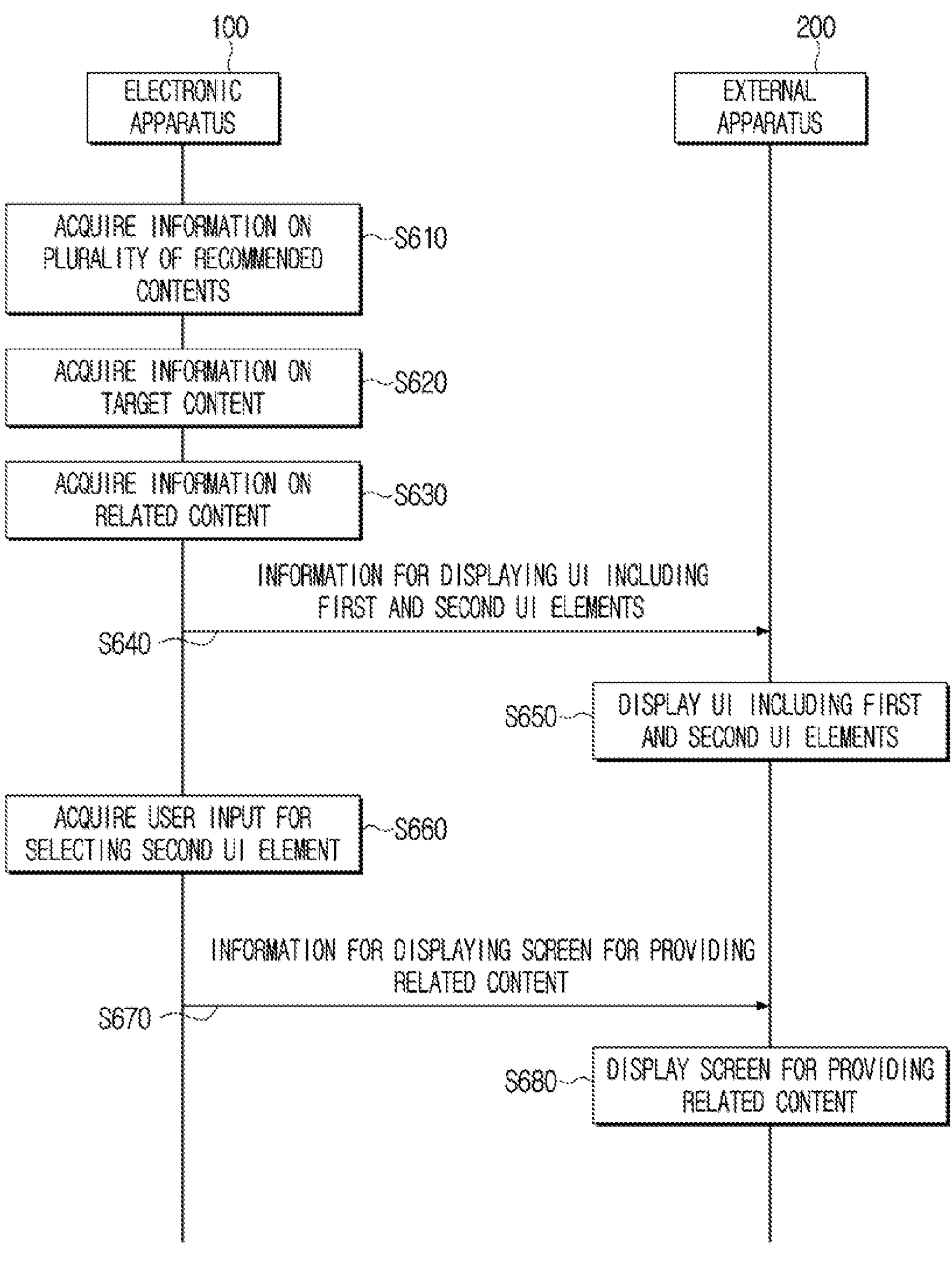
FIG. 6 is a sequence diagram for explaining a method of controlling an external apparatus to display a UI by the electronic apparatus according to one or more embodiments of the disclosure.

Referring to FIG. 6, the electronic apparatus 100 may acquire the information on the plurality of recommended contents (S610), and acquire the information on the target content among the plurality of recommended contents (S620).

The electronic apparatus 100 may then acquire the information on the related content in case of acquiring the information on the target content (S630).

Figure 7:
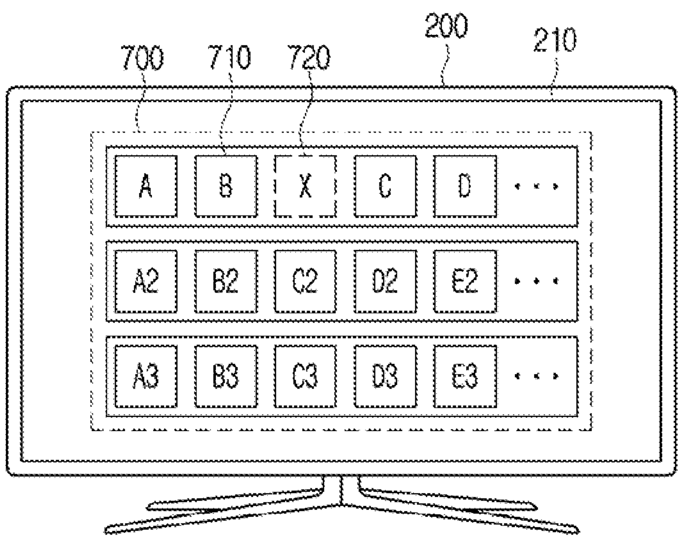
FIG. 7 is a view for explaining a method of controlling an external apparatus to display a UI by the electronic apparatus according to one or more embodiments of the disclosure.

In case of acquiring the information on the related content, the electronic apparatus 100 may transmit, to the external apparatus 200, information for displaying the UI including the second UI element corresponding to the related content (S640) to thus control the external apparatus 200 to display the UI (S650). For example, as shown in FIG. 7, a UI 700 including a second UI element 720 may be displayed on one side of a first UI element 710 on a display 210 of the external apparatus 200.

Meanwhile, the electronic apparatus 100 may here separate first information for displaying the UI including the UI element corresponding to each of the plurality of recommended contents and second information for displaying the second UI element corresponding to the related content, and transmit the same to the external apparatus 200. Here, the first information may be information for displaying a UI for disposing the UI element corresponding to each of the plurality of recommended contents based on the disposition pattern of the list of the recommended contents acquired by the content recommendation module 171. In addition, the second information may include information on the position where the second UI element is disposed on the UI. For example, the second information may include information that the second UI element is disposed on the right side of the target content. Here, the external apparatus 200 may display and provide the UI including the second UI element by combining the first information and the second information together. For example, the disposition pattern of the list of the recommended contents may be the same as the disposition pattern of a recommended content 300 shown in FIG. 3. Here, the electronic apparatus 100 may control the external apparatus 200 to display the UI 400 as shown in FIG. 4 in case that the content B disposed in the column #2 of the row #1 is identified as the target content, and the related content X of the content B is positioned on the right side of the content B. Here, the external apparatus 200 may display the UI using only the first information in case that the external apparatus 200 is a device that cannot display the second UI element.

Alternatively, the electronic apparatus 100 may transmit, to the external apparatus 200, the information for displaying the UI including the UI element corresponding to each of the plurality of recommended contents and the second UI element corresponding to the related content. Accordingly, the external apparatus 200 may display the UI by using the information for displaying the UI including the UI element corresponding to each of the plurality of recommended contents and the second UI element.

In addition, in case of acquiring a user input for selecting the second UI element through the communication interface 120 or the user interface 130 (S660), the electronic apparatus 100 may transmit, to the external apparatus 200, information for displaying the screen for providing the related content corresponding to the second UI element (S670) to control the external apparatus 200 to display the screen for providing the related content (S680).

Meanwhile, the electronic apparatus 100 may provide the UI by controlling the external apparatus through the communication interface 120, which is only an example, and the electronic apparatus 100 may provide the UI through various methods such as displaying the UI by using the display 150 included in the electronic apparatus 100 or displaying the UI by outputting the video signal for displaying the UI through the input/output interface 130.

In addition, in case of acquiring the user input for selecting the UI element corresponding to each of the plurality of recommended contents, the UI provision module 174 may provide the content corresponding to the selected UI element or the screen for providing the content corresponding to the selected UI element.

In addition, in case of acquiring the user input for selecting the second UI element, the UI provision module 174 may provide the screen for providing the related content. In detail, the UI provision module 174 may control the display 150 to output a list of the related contents in case of acquiring the user input for selecting the second UI element.

Meanwhile, according to one or more embodiments of the disclosure, in case that the second UI element is selected, the UI provision module 174 may provide the list of the related contents. Here, the list of the related contents may include the UI element corresponding to each of the plurality of related contents. For example, an identified genre of the target content may be "action," and the related content may be an action movie content. Here, in case that the second UI element is selected, the UI provision module 174 may provide the plurality of UI elements for entering a screen for providing the plurality of action movies.

Figure 8A:
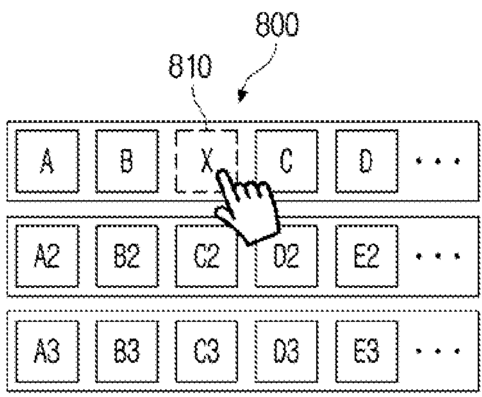
FIG. 8A is a view for explaining a UI including a second UI element according to one or more embodiments of the disclosure.
Figure 8B:
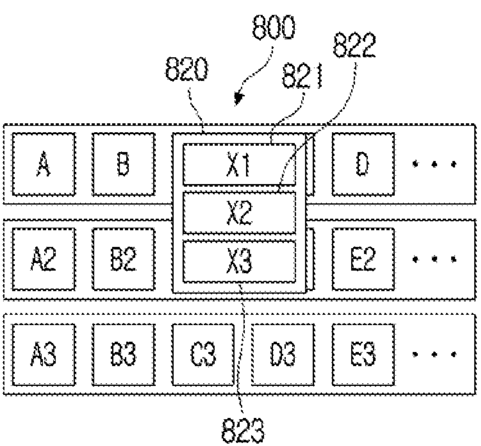
FIG. 8B is a view for explaining a method of providing a list of related content according to one or more embodiments of the disclosure.

That is, as shown in FIG. 8A, a UI 800 may be provided, and a second UI element 810 may be selected on the UI 800. Here, the UI provision module 174 may display a list 820 of related contents on the UI 800, as shown in FIG. 8B. Here, the list 820 of the related contents may include UI elements 821, 822, and 823 respectively corresponding to the plurality of related contents. In case that one of the UI elements 821, 822, and 823 respectively corresponding to the related contents is selected, the UI provision module 174 may provide the selected related content or provide the screen for providing the related content.

Meanwhile, in case that the information on the target content is acquired and the predetermined condition is satisfied, the UI provision module 174 may provide the UI including the second UI element that enters the screen for providing the related content related to the target content.

According to one or more embodiments of the disclosure, the UI provision module 174 may identify whether to provide the UI including the second UI element based on a history in which the content is pre-identified as the target content.

Figure 9:
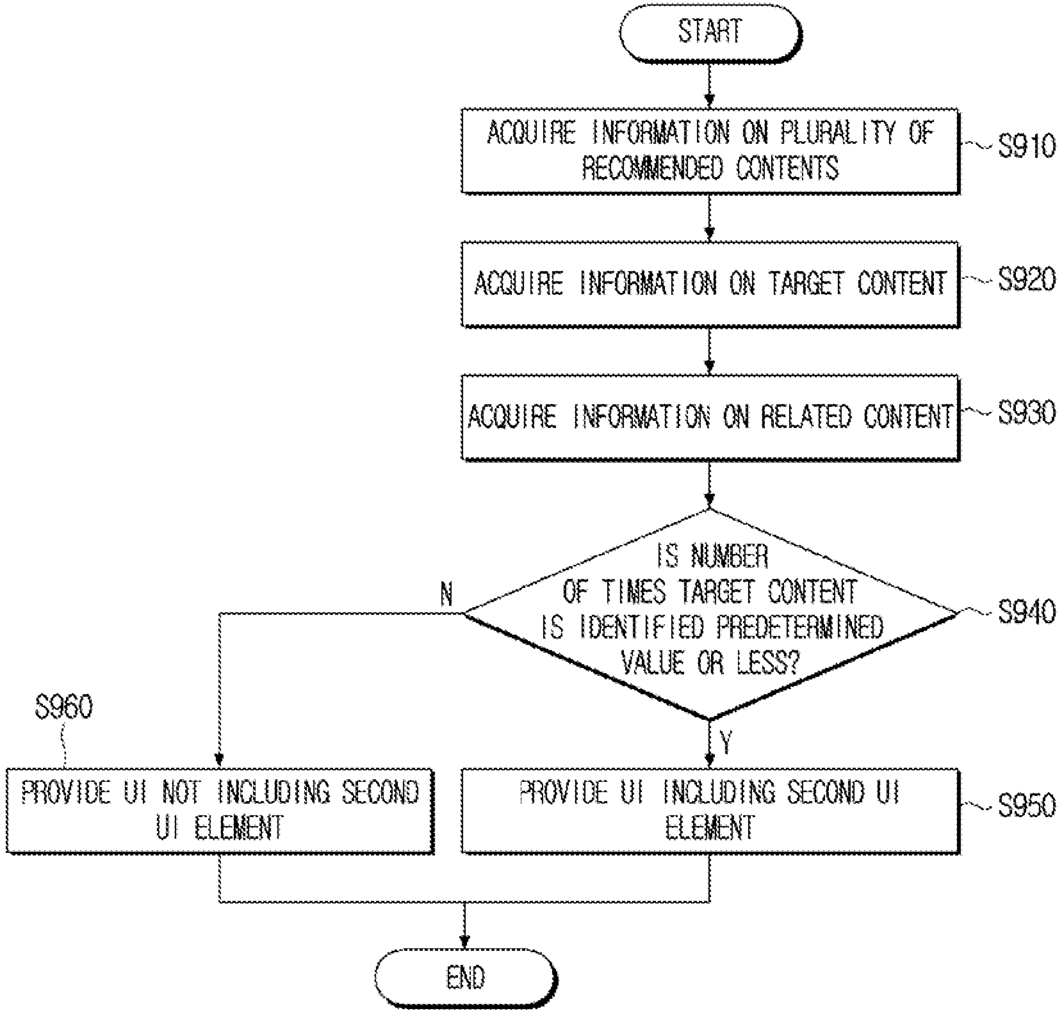
FIG. 9 is a flowchart for explaining a method of the electronic apparatus providing a UI based on a predetermined condition according to one or more embodiments of the disclosure.

In detail, referring to FIG. 9, the content recommendation module 171 may acquire the information on the plurality of recommended contents (S910), and the content target module 172 may acquire information on the content A which is the target content among the plurality of recommended contents (S920). The related content acquisition module 173 may then acquire information on the related content related to the content A (S930).

In addition, the UI provision module 174 may identify whether to provide the second UI element corresponding to the related content related to the content A based on a history in which the content A is identified as the target content.

In detail, the memory 110 may store information on the history in which the content A is identified as the target content. Here, the UI provision module 174 may identify whether the number of times the content A is identified as the target content is the predetermined value or less (S940). Alternatively, the electronic apparatus 100 may receive information on the history in which the content A is identified as the target content from the external server.

In case that the number of times the content A is identified as the target content is the predetermined value or less (S940—Y), the UI provision module 174 may provide the UI including the second UI element corresponding to the related content (S950).

On the other hand, in case that the number of times the content A is identified as the target content is more than the predetermined value (S940—N), the UI provision module 174 may provide the UI including the UI elements corresponding to the plurality of contents without including the second UI element (S960). Here, in the UI, the disposition pattern of the UI elements corresponding to the plurality of contents may be the same as the disposition pattern of the list of the recommended contents.

Figure 10:
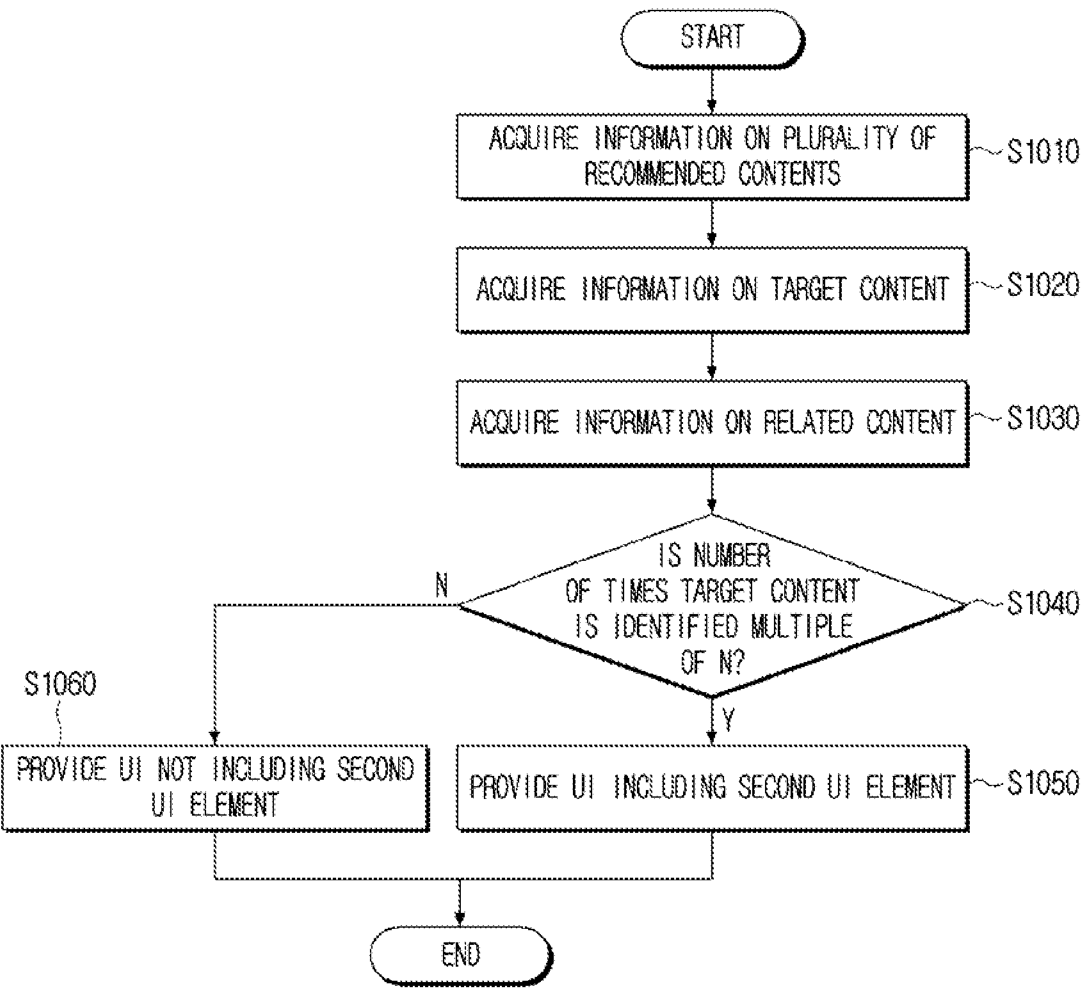
FIG. 10 is a flowchart for explaining a method of the electronic apparatus providing a UI based on a predetermined condition according to one or more embodiments of the disclosure.

Alternatively, referring to FIG. 10, the content recommendation module 171 may acquire the information on the plurality of recommended contents (S1010), and the content target module 172 may acquire the information on the content A which is the target content among the plurality of recommended contents (S1020). The related content acquisition module 173 may then acquire the information on the related content related to the content A (S1030).

The UI provision module 174 may then identify whether the number of times the content A is identified as the target content is a multiple of N (S1040). Here, the information on the content A identified as the target content may be pre-stored in the memory 110 or may be information received by the electronic apparatus 100 from the external server.

In case that the number of times the content A is identified as the target content is the multiple of N (S1040—Y), the UI provision module 174 may provide the UI including the second UI element corresponding to the related content (S1050).

On the other hand, in case that the number of times the content A is identified as the target content is not the multiple of N (S1040—Y), the UI provision module 174 may provide the UI including the UI elements corresponding to the plurality of contents without including the second UI element (S1060). Here, in the UI, the disposition pattern of the UI elements corresponding to the plurality of contents may be the same as the disposition pattern of the list of the recommended contents.

Alternatively, according to one or more embodiments of the disclosure, the UI provision module 174 may identify whether to provide the UI including the second UI element based on a history in which the UI including the second UI element corresponding to the related content is provided to the user.

Figure 11:
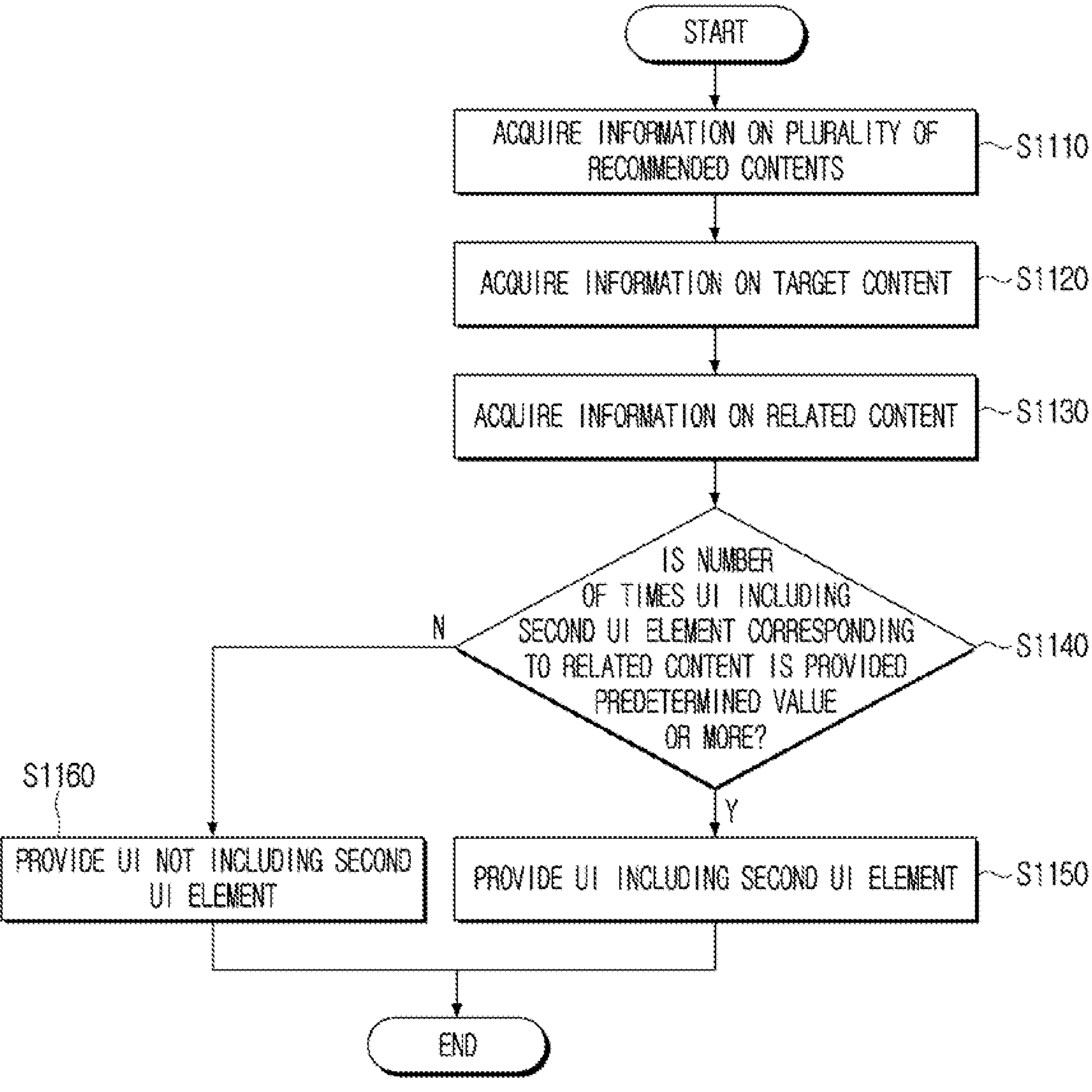
FIG. 11 is a flowchart for explaining a method of the electronic apparatus providing a UI based on a predetermined condition according to one or more embodiments of the disclosure.

In detail, referring to FIG. 11, the content recommendation module 171 may acquire the information on the plurality of recommended contents (S1110), and the content target module 172 may acquire the information on the content A which is the target content among the plurality of recommended contents (S1120). The related content acquisition module 173 may then acquire the information on the related content related to the content A (S1130).

The UI provision module 174 may then identify whether the content A is identified as the target content, and the number of times the UI including the second UI element corresponding to the related content related to the content A is provided is the predetermined value or more (S1140). Here, the information on the number of times the content A is identified as the target content and the UI including the second UI element corresponding to the related content related to the content A is provided may be pre-stored in the memory 110 or information received from the outside by the electronic apparatus 100.

In case that the number of times the UI including the second UI element is provided is the predetermined value or more (S1140—Y), the UI provision module 174 may provide the UI including the UI elements corresponding to the plurality of contents without including the second UI element (S1150). Here, in the UI, the disposition pattern of the UI elements corresponding to the plurality of contents may be the same as the disposition pattern of the list of the recommended contents.

On the other hand, in case that the number of times the UI including the second UI element is provided is less than the predetermined value (S1140—N), the UI provision module 174 may provide the UI including the second UI element (S1170).

Alternatively, according to one or more embodiments of the disclosure, the UI provision module 174 may provide the UI including the second UI element limitedly only for a predetermined period.

Figure 12:
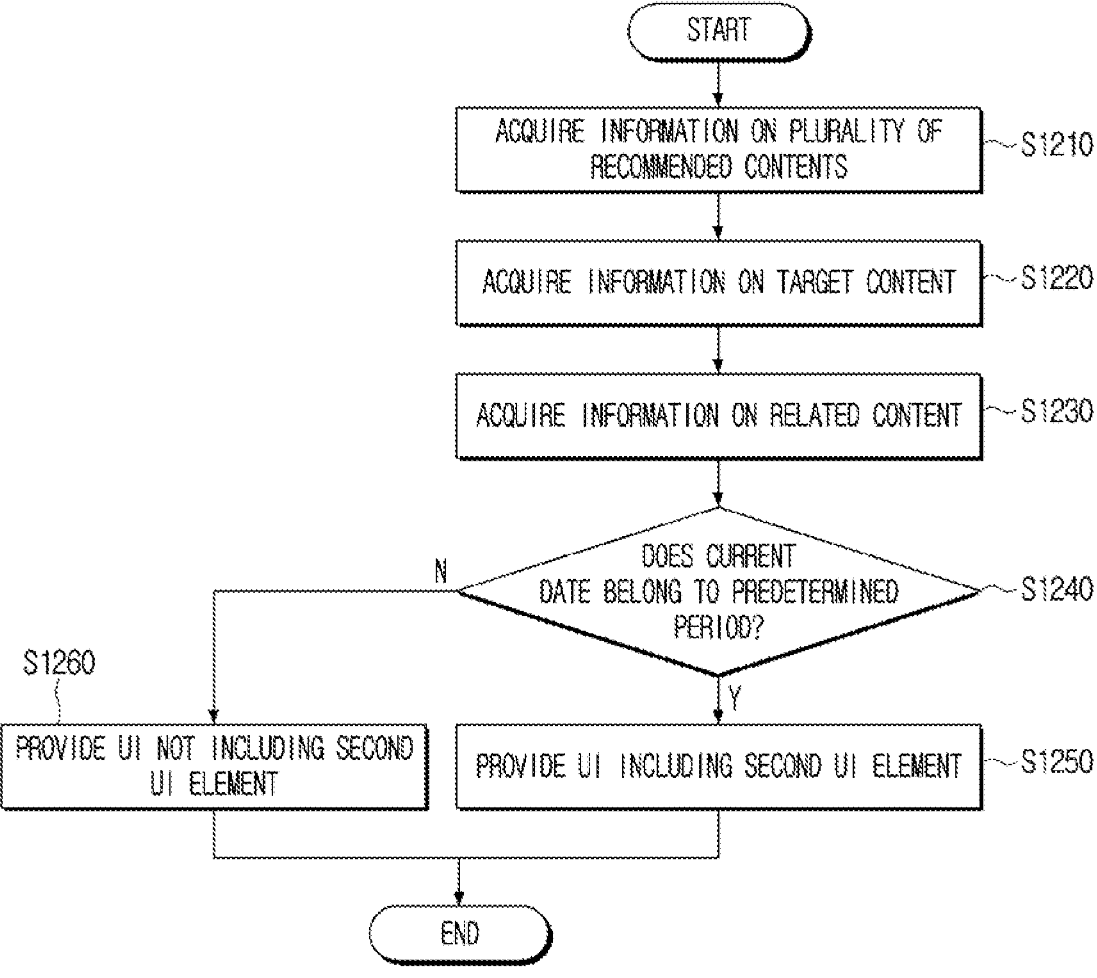
FIG. 12 is a flowchart for explaining a method of the electronic apparatus providing a UI based on a predetermined condition according to one or more embodiments of the disclosure.

In detail, referring to FIG. 12, the content recommendation module 171 may acquire the information on the plurality of recommended contents (S1210), and the content target module 172 may acquire the information on the content A which is the target content among the plurality of recommended contents (S1220).

The UI provision module 174 may then identify whether a current date belongs to the predetermined period (S1230). In case of identifying that the current date belongs to the predetermined period (S1230—Y), the UI provision module 174 may provide the UI including the second UI element (S1240). Here, information on the current date may be pre-stored in the memory 110 or may be information received by the electronic apparatus 100 from the external server.

On the other hand, in case of identifying that the current date does not belong to the predetermined period (S1230—N), the UI provision module 174 may provide the UI including the UI element corresponding to the plurality of contents without including the second UI element (S1250). Here, in the UI, the disposition pattern of the UI elements corresponding to the plurality of contents may be the same as the disposition pattern of the list of the recommended contents.

Meanwhile, the second UI element corresponding to the related content related to the target content may be provided, and the content target module 172 may acquire the information on the target content based on a history in which the second UI element is selected. That is, the content target module 172 may acquire the information on the target content based on the history in which the pre-provided second UI element is selected. In other words, the content target module 172 may acquire the information on the target content based on the history in which the second UI element corresponding to the related content is pre-selected.

Figure 13:
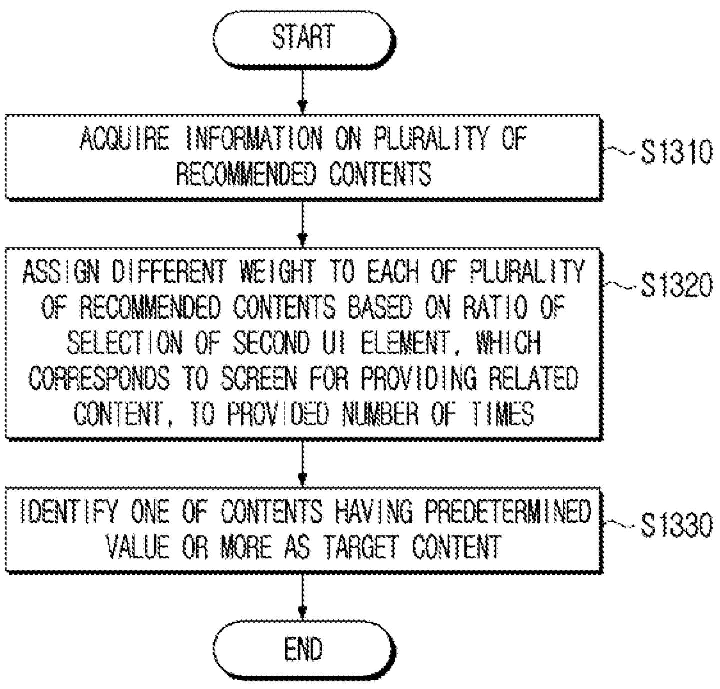
FIG. 13 is a flowchart for explaining a method of the electronic apparatus identifying target content according to one or more embodiments of the disclosure.

In detail, referring to FIG. 13, the content recommendation module 171 may acquire the information on the plurality of recommended contents (S1310).

In addition, the memory 110 may store information on whether at least one target content is identified, and at least one second UI element is selected by the user after at least one second UI element that enters the screen for providing the related content related to each of the at least one target content is provided.

Here, the content target module 172 may assign a different weight to each of the plurality of recommended contents based on a ratio of selection of the second UI element, which corresponds to the related content related to each of the plurality of recommended contents, to the provided number of times (S1320). Here, the content target module 172 may assign a higher weight to a content related to the related content having a higher ratio of the selection to the provided number of times.

The content target module 172 may identify one of the contents having the predetermined value or more as the target content (S1330).

According to one or more embodiments of the disclosure, the electronic apparatus 100 may communicate with the external server and perform various operations according to the disclosure.

Figure 14:
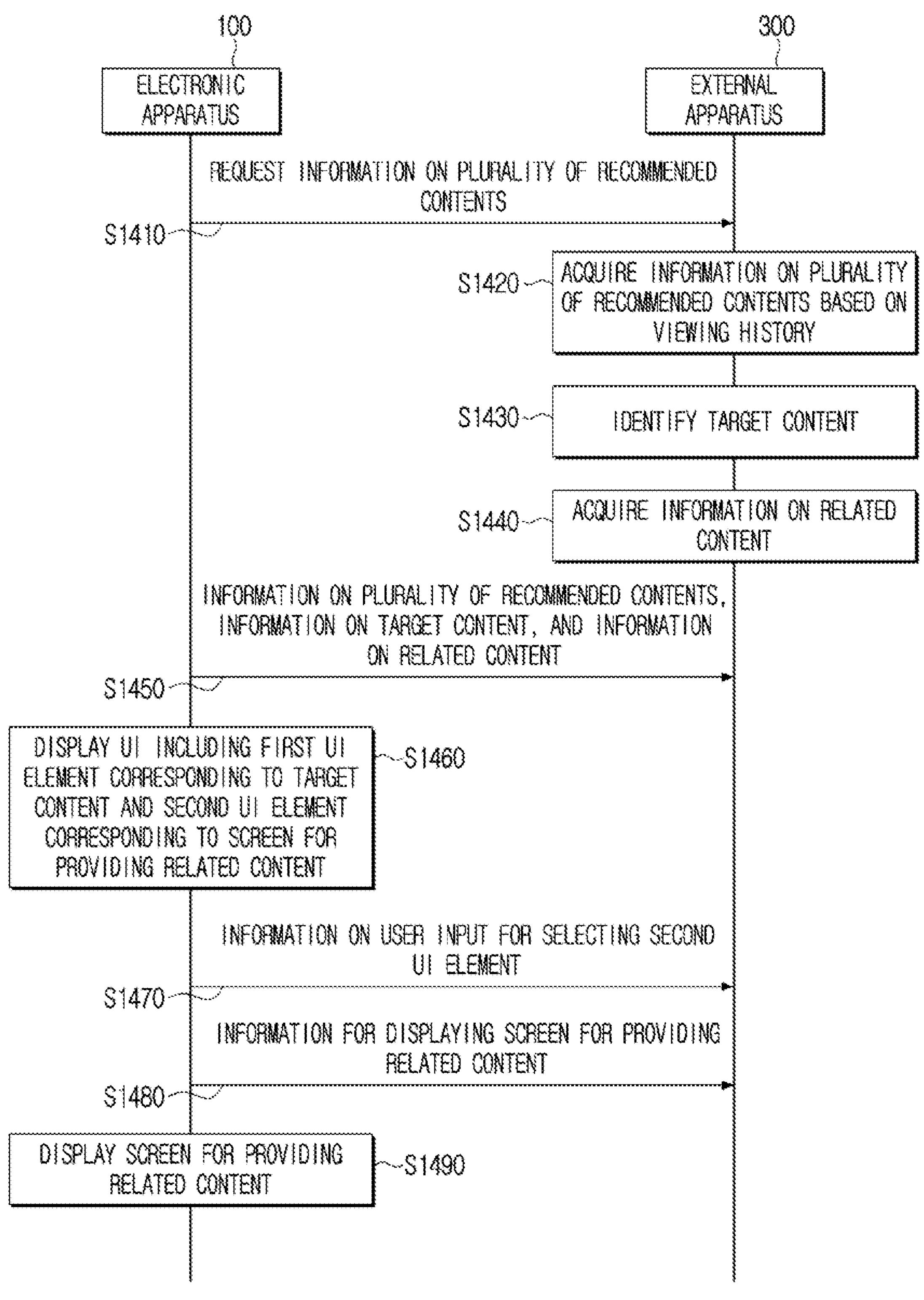
FIG. 14 is a sequence diagram for explaining an operation of the electronic apparatus communicating with an external server according to one or more embodiments of the disclosure.

Referring to FIG. 14, the electronic apparatus 100 may request the information on the plurality of recommended contents from the external apparatus 300 through the communication interface 120 (S1410).

The external server 300 may then acquire the information on the plurality of recommended contents based on the user viewing history (S1420).

The external server 300 may then identify the target content for providing the related content among the plurality of recommended contents (S1430), and acquire the information on the related content related to the target content (S1440).

The electronic apparatus 100 may then receive the information on the plurality of recommended contents, the information on the target content, and the information on the related content related to the target content for providing the related content among the plurality of recommended contents from the external server 300 through the communication interface 120 (S1450).

The electronic apparatus 100 may then control the display 150 to output the UI including the first UI element corresponding to the target content and the second UI element corresponding to the screen for providing the related content based on the information on the plurality of recommended contents, the information on the target content, and the information on the related content related to the target content (S1460).

Alternatively, the external server 300 may transmit, to the electronic apparatus 100, information for outputting the UI including the first UI element corresponding to the target content and the second UI element corresponding to the screen for providing the related content.

Accordingly, the electronic apparatus 100 may control the display 150 to output the UI including the first UI element corresponding to the target content and the second UI element corresponding to the screen for providing the related content.

In case of acquiring the user input for selecting the second UI element while the UI is displayed, the electronic apparatus 100 may transmit information on the user input for selecting the second UI element to the external server 300 (S1470).

Accordingly, the external server 300 may transmit the information for displaying the screen for providing the related content to the electronic apparatus 100 (S1480).

The electronic apparatus 100 may then control the display 150 to display the screen for providing the related content (S1490).

Meanwhile, at least some of the operations of the external server 300 acquiring the information on the plurality of recommended contents, acquiring the target content and the information on the related content, and acquiring the information for displaying the UI may be the same as those of the above-described content recommendation module 171, content target module 172, related content acquisition module 173, and UI provision module 174.

Meanwhile, the term "—er/—or" or "module" used in the disclosure may include a unit including hardware, software or firmware, and may be used interchangeably with the term, for example, a logic, a logic block, a component or a circuit. The "—er/—or" or "module" may be an integrally formed component, or a minimum unit or part performing one or more functions. For example, the module may include an application-specific integrated circuit (ASIC).

The various embodiments of the disclosure may be implemented by software including an instruction stored in a machine-readable storage medium (for example, the computer-readable storage medium). A machine may be a device that invokes the stored instruction from the storage medium and be operated based on the invoked instruction, and may include the electronic apparatus 100 in the disclosed embodiments. In case that the instruction is executed by the processor, the processor may directly perform a function corresponding to the instruction or other components may perform the function corresponding to the instruction under control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

According to other embodiments, the method according to the various examples disclosed in the disclosure may be included in a computer program product and then provided. The computer program product may be traded as a product between a seller and a purchaser. The computer program product may be distributed in a form of the machine-readable storage medium (for example, a compact disc read only memory (CD-ROM)) or online through an application store (for example, PlayStore™). In case of the online distribution, at least portions of the computer program product may be at least temporarily stored or temporarily provided in a storage medium such as a memory of a server of a manufacturer, a server of an application store or a relay server.

Each of components (for example, modules or programs) according to the various embodiments may include one entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, and at least some of the operations may be performed in a different order or be omitted, or other operations may be added.

What is claimed is:

1. An electronic apparatus comprising:
a communication interface;
a display;
a memory to store at least one instruction; and
a processor configured to execute the at least one instruction to:
acquire information associated with a plurality of recommended contents, through the communication interface, based on a user viewing history,
acquire information associated with a target content, through the communication interface, based on the information associated with the plurality of recommended contents, the target content being acquired with additional content that is obtained based on a relationship of the additional content to the target content,
identify an arrangement in which the plurality of recommended contents are to be output on the display, and
control the display to output a user interface (UI) subsequent to the arrangement in which the plurality of recommended contents are to be output being identified such that the UI outputs a first UI element corresponding to the target content within the arrangement of the plurality of recommended contents,
identify whether a predetermined condition to control the display to output a second UI element relative to the first UI element is satisfied, and based on the predetermined condition being identified as satisfied, identify a position adjacent to the target content that is output through the first UI element and add the second UI element corresponding to the additional content, to the arrangement in which the first UI is included, at the position adjacent to the first UI element, wherein the predetermined condition is based on at least one of a history in which the target content is identified as the target content, a history in which the UI including the second UI element corresponding to the additional content is provided to a user or whether a current date belongs to a predetermined period.

2. The electronic apparatus as claimed in claim 1, wherein the processor is configured to control the display to display the second UI element in a region adjacent to the first UI element.

3. The electronic apparatus as claimed in claim 1, wherein the processor is configured to:

control the display to output a plurality of UI elements including the first UI element, and control the display to display the second UI element between one of the plurality of UI elements and the first UI element.

4. The electronic apparatus as claimed in claim 1, wherein the processor is configured to control the display to display a screen to output the additional content where the screen is output based on a user input selecting the second UI element.

5. The electronic apparatus as claimed in claim 1, wherein the processor is configured to control the display to output a list of related contents based on a user input selecting the second UI element.

6. The electronic apparatus as claimed in claim 1, wherein the processor is configured to acquire information associated with the target content based on metadata of the plurality of recommended contents.

7. The electronic apparatus as claimed in claim 1, wherein the processor is configured to acquire information associated with the target content based on information associated with a history in which the second UI element is selected.

8. The electronic apparatus as claimed in claim 1, wherein information associated with the plurality of recommended contents includes information associated with a position where a list of the plurality of recommended contents is output on the display.

9. The electronic apparatus as claimed in claim 1, wherein the processor is configured to acquire information associated with the target content based on information associated with a position where a list of the plurality of recommended contents is output on the display.

10. The electronic apparatus as claimed in claim 1, wherein the additional content is metadata of the target content.

11. A method of controlling an electronic apparatus, comprising:

acquiring information associated with a plurality of recommended contents based on a user viewing history;

acquiring information associated with a target content based on the information associated with the plurality of recommended contents, the target content being acquired with additional content that is obtained based on a relationship of the additional content to the target content;

identifying an arrangement in which the plurality of recommended contents are to be output; and displaying a user interface (UI) subsequent to the arrangement in which the plurality of recommended contents are to be output being identified such that the UI outputs a first UI element corresponding to the target content is included within the arrangement of the plurality of recommended contents, identifying whether a predetermined condition to control the display to output a second UI element relative to the first UI element is satisfied, and based on the predetermined condition being identified as satisfied, identifying a position adjacent to the target content that is output through the first UI element and adding the second UI element corresponding to the additional content, to the arrangement in which the first UI is included, at the position adjacent to the first UI element, wherein the predetermined condition is based on at least one of a history in which the target content is identified as the target content, a history in which the UI including the second UI element corresponding to the additional content is provided to a user or whether a current date belongs to a predetermined period.

12. The method as claimed in claim 11, wherein in the displaying of the UI, the second UI element is displayed in a region adjacent to that of the first UI element.

13. The method as claimed in claim 11, wherein in the displaying of the UI, a plurality of UI elements including the first UI element are displayed, and the second UI element is displayed between one of the plurality of UI elements and the first UI element.

14. The method as claimed in claim 11, further comprising displaying a screen to output the additional content, where the screen is output based on a user input selecting the second UI element is acquired.

15. The method as claimed in claim 11, further comprising displaying a list of related contents based on a user input in case that the user input for selecting the second UI element is acquired.

16. The method as claimed in claim 11, wherein the acquiring information associated with the additional content comprises:

acquiring information associated with the target content based on metadata of the plurality of recommended contents.

17. The method as claimed in claim 11, wherein the acquiring information associated with the additional content comprises:

acquiring information associated with the target content based on information associated with a history in which the second UI element is selected.

18. The method as claimed in claim 11, wherein information associated with the plurality of recommended contents includes information associated with a position where a list of the plurality of recommended contents is output on a display.

19. The method as claimed in claim 11, wherein the acquiring information associated with the additional content comprises:

acquiring information associated with the target content based on information associated with a position where a list of the plurality of recommended contents is output on a display.

20. A non-transitory computer readable medium for storing computer readable program code or instructions which are executable to perform a method for controlling an electronic apparatus, the method comprising:

acquiring information associated with a plurality of recommended contents based on a user viewing history;

acquiring information associated with a target content based on the information associated with the plurality of recommended contents, the target content being acquired with additional content that is obtained based on a relationship of the additional content to the target content;

identifying an arrangement in which the plurality of recommended contents are to be output; and displaying a user interface (UI) subsequent to the arrangement in which the plurality of recommended contents are to be output being identified such that the UI outputs a first UI element corresponding to the target content is included within the arrangement of the plurality of recommended contents, identify whether a predetermined condition to control the display to output a second UI element relative to the first UI element is satisfied, based on the predetermined condition being identified as satisfied, identifying a position adjacent to the target content that is output through the first UI element and adding the second UI element corresponding to the additional content, to the arrangement in which the first UI is included, at the position adjacent to the first UI element, wherein the predetermined condition is based on at least one of a history in which the target content is identified as the target content, a history in which the UI including the second UI element corresponding to the additional content is provided to a user or whether a current date belongs to a predetermined period.

* * * * *